INVENTORS:
George P. Olsen
Philip H. Towle
Richard H. Baldwin
BY Manford Q. Hatten
ATTORNEY

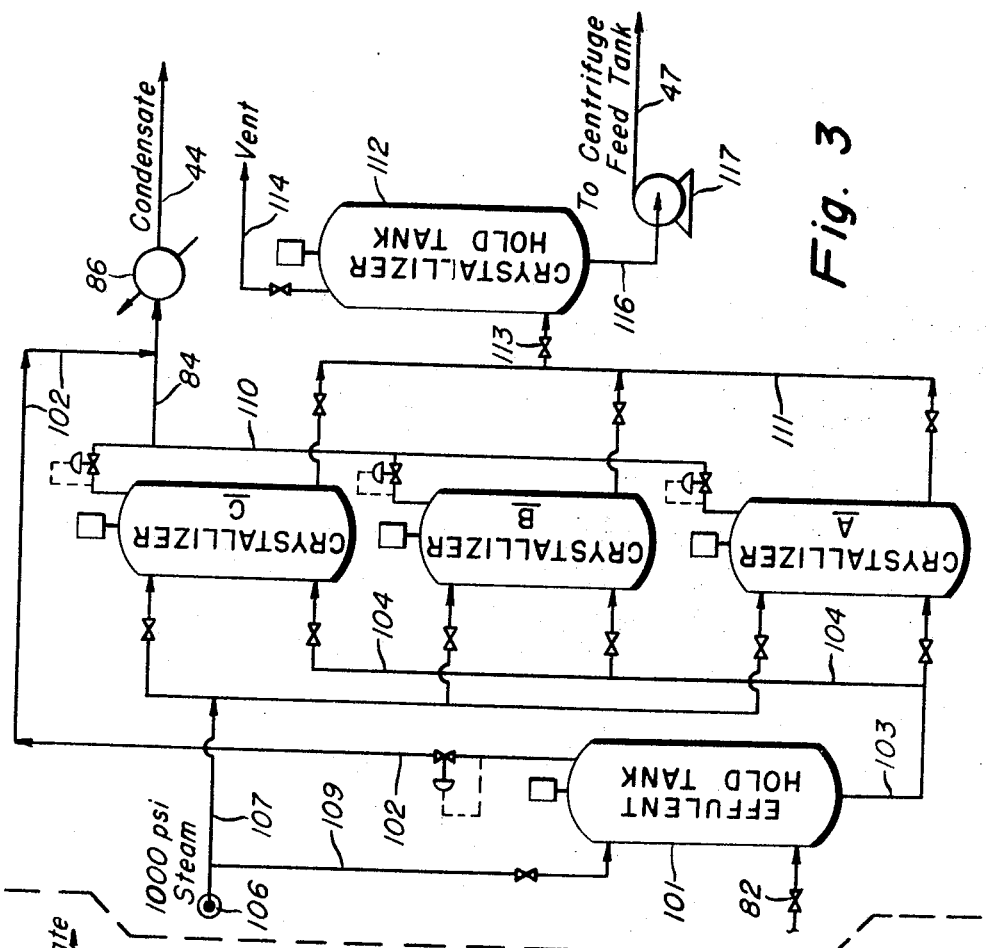
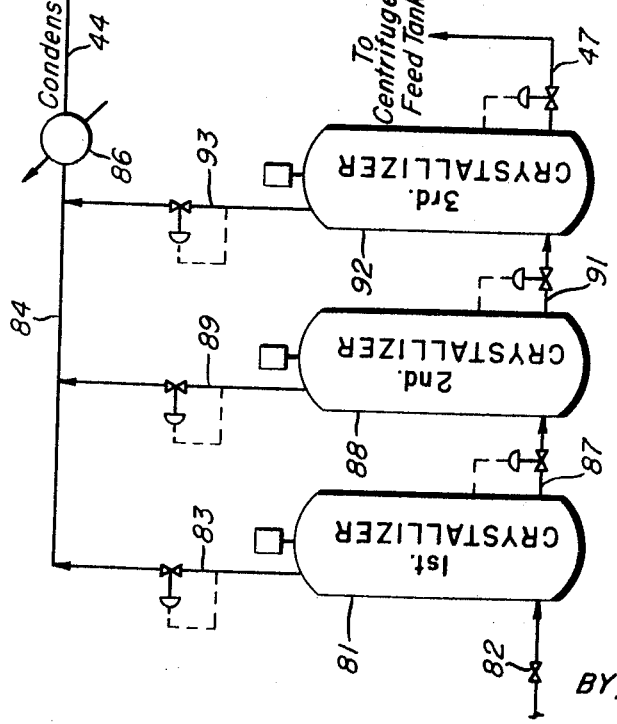

United States Patent Office 3,639,465
Patented Feb. 1, 1972

3,639,465
PURIFICATION OF AROMATIC POLYCARBOX-
YLIC ACIDS BY CATALYTIC REDUCTION
USING PREHUMIDIFIED HYDROGEN
George P. Olsen, Highland, Ind., and Philip H. Towle, Chicago, and Richard H. Baldwin, Oak Lawn, Ill., assignors to Standard Oil Company, Chicago, Ill.
Continuation-in-part of application Ser. No. 456,218, May 17, 1965. This application June 18, 1968, Ser. No. 737,875
Int. Cl. C07c 51/42
U.S. Cl. 260—525
6 Claims

ABSTRACT OF THE DISCLOSURE

Use of prehumidified hydrogen-containing gas for purification of aromatic polycarboxylic acids contaminated with reducible impurities including aldehydic aromatic acids in processes including the step of contacting aqueous solution substantially saturated with impure aromatic polycarboxylic acid and hydrogen with noble metal-containing catalyst by percolation of the solution through a bed of the catalyst.

CROSS REFERENCE

Figure 1:
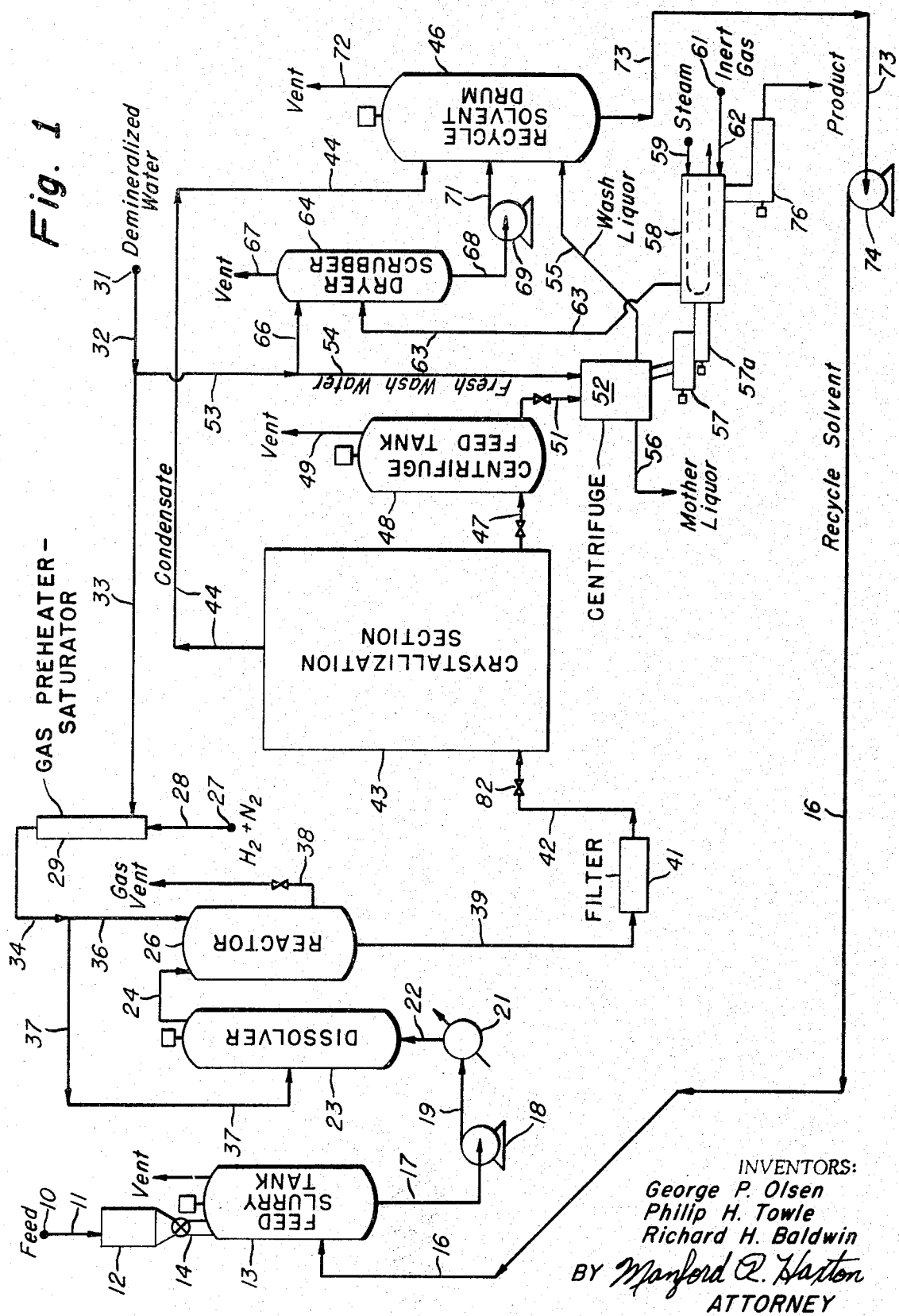

This application is a continuation in part of our earlier filed application Ser. No. 456,218, filed May 17, 1965, which is now abandoned.

BACKGROUND OF THE INVENTION

This invention relates to the purification of polycarboxylic aromatic acids, and more particularly concerns the preparation of polycarboxylic aromatic acid having a purity sufficient for direct esterification with diols to produce super polyesters. The process of the present invention is applicable to purification of polycarboxylic aromatic acids such as, for example, terephthalic, trimesic, isophthalic, naphthalene dicarboxylic, trimellitic, mellitic, etc. The process is described herein as applied to the purification of crude terephthalic acid to produce terephthalic acid of fiber-grade quality, however, this should not be deemed a limitation of the process.

High molecular weight polyesters of terephthalic acid with various diols find extensive use as Dacron, Terylene, Kodel, and Vycron fibers, and Mylar film. These super polyesters, first described in U.S. Pat. 2,465,319 to Whinfield and Dickson, have heretofore been prepared from dimethylterephthalate, which is trans-esterified with the appropriate diol, such as ethylene glycol, and then polycondensed to form the super polyester. Polyester preparation via dimethyl terephthalate has been considered an essential step by reason of the exceptionally high purity requirements imposed on the polyester.

With the advent of improved processes for the manufacture of terephthalic acid, much attention has been directed to obtaining polyesters by direct esterification of terephthalic acid with the diol. This has manifest advantages of simplicity and economy as compared with the dimethylterephthalate route. As yet, however, there remains serious difficulty in obtaining terephthalic acid of suitable purity. Unless the initial terephthalic acid is virtually completely free from extraneous contaminants, the polyester will have too low a melting point and will be of unsatisfactory color.

It is believed that terephthalic acid impurities are of two types. First, the compound 4-carboxybenzaldehyde, an intermediate formed when terephthalic acid is obtained from the oxidation of paraxylene or other para-disubstituted alkyl benzene, is known to be deleterious with respect to polyester quality. Second, unidentified color bodies, possibly of the benzil or fluoronone structure, are usually present as trace by-products of most terephthalic acid production processes, and yield off-color polyesters. Any method of purifying terephthalic acid must reduce or eliminate both the 4-carboxybenzaldehyde (4-CBA) and the other impurities such as color bodies.

THE INVENTION

It has been discovered, according to published Netherlands application No. 6,403,348, that terephthalic acid of a purity suitable for direct esterification with a diol to produce films and fibers may be obtained from the above impure terephthalic acid by catalytically hydrogen treatment of polar solvent solution, preferably aqueous solution, of the impure acid under liquid phase conditions preferably by percolating the solution and hydrogen or mixture of hydrogen and inert gas through a bed of catalyst particles having noble metal hydrogenation catalyst. The improvement afforded by this invention is the contacting of the catalyst with the solution of aromatic polycarboxylic acid and prehumidified hydrogen containing gas with a noble metal-containing catalyst under mild hydrogenating conditions and recovering from the thus contacted solution purified acid containing substantially less aldehyde and other impurities. By this improved process, there is a chemical reduction of the aldehyde as well as a significant destruction of the color body impurity. Surprisingly, when prehumidified hydrogen-containing gas is used plugging difficulties which otherwise occur in the reactor and in the catalyst bed when dry gas is used, itself, are avoided. It is unexpected that prehumidifying the hydrogen-containing gas feed would have this effect since no less than about 70% of the liquid process stream is water at the upper preferred solute content of the solution.

According to the present invention there is provided a process for purifying aromatic polycarboxylic acid produced by liquid phase catalytic oxidation of polyalkyl aromatic hydrocarbons to remove undesirable aldehyde and other impurities (e.g. of benzil and fluorenone structure) comprising the steps of forming an aqueous solution of said acid containing said impurities in water, contacting said solution and prehumidified hydrogen-containing gas with a noble metal-containing catalyst under mild hydrogenation conditions, and recovering purified acid containing substantially less of said undesirable impurities. The process is particularly well suited for purification of aromatic dicarboxylic acids, for example, purifying crude terephthalic acid having the impurities before mentioned to a fiber grade product. The recovering of purified acid is conveniently effected by crystallizing the acid from the hydrogen treated aqueous solution. The noble metal-containing catalyst suitably consists essentially of charcoal having supported thereon 0.01 to 1.0% by weight of the noble metal. Preferably the charcoal support is one having a surface area in the range of about 1,000 to 2,000 square meters per gram. Particularly desirable noble metals for use as the catalyst are platinum and palladium, preferably palladium.

The present invention also provides a method of purifying crude aromatic polycarboxylic acid obtained by catalytic liquid phase oxidation of a polyalkyl aromatic hydrocarbon with molecular oxygen in the presence of a heavy metal oxidation catalyst said aromatic hydrocarbon having at least two nuclear alkyl hydrocarbon substituents whose carbon attached to the nuclear aromatic carbon has at least one hydrogen atom, which crude aromatic polycarboxylic acid has an aromatic polycarboxylic acid content of at least 99.0% by weight, preferably 99.5 wt. percent, and which has as its principal impurity a carboxy aromatic aldehyde corresponding to said aromatic polycarboxylic acid, which method comprises forming an aqueous liquid solution of said crude acid in water, contacting said solution in the liquid phase at a temperature in the range of about 450–600° F. and prehumidified hydrogen-containing gas with a noble metal-containing hydrogenation catalyst for a time sufficient to effect substantial reduction of said aldehyde and recovering purified acid containing less than 125 p.p.m. of said aldehyde. Preferably the solution is at a temperature of about 10° F. above solute precipitation point.

According to a preferred embodiment of the present invention there is provided a method of producing fiber-grade terephthalic acid from crude terephthalic acid obtained by catalytic liquid phase oxidation of paraxylene with molecular oxygen in the presence of a heavy metal oxidation catalyst, which crude terephthalic acid has a terephthalic acid content of at least 99.0% by weight, preferably 99.5 wt. percent, and which has as its principal impurity 4-carboxybenzaldehyde, which method comprises forming a solution of said crude terephthalic acid in water, contacting said solution in the liquid phase at a temperature in the range of about 450 to 600° F. and prehumidified hydrogen-inert gas mixture with a noble metal-charcoal hydrogenation catalyst for a time sufficient to effect substantial reduction of said aldehyde to para-toluic acid and recovering fiber-grade terephthalic acid by crystallization.

When terephthalic acid, or other aromatic dicarboxylic acid to be employed in super polyester production, is purified by the process of the present invention it is said to be of "fiber-grade" quality. The term "fiber-grade" does not denote a quantitative degree of purity, but rather describes a terephthalic acid which is sufficiently free from 4-carboxybenzaldehyde and other impurities so as to yield a super polyester upon direct esterification with a diol which is satisfactory for the intended purpose. Thus, terephthalic acid polyester intended for transparent film or white fiber will require significantly higher purity terephthalic acid than polyesters intended for tire reinforcing cord. The suitable 4-carboxybenzaldehyde (4-CBA) content of terephthalic acid for use in producing colorless film and fiber is less than about 125 parts per million (p.p.m.) while for tire cord it may be as high as 500 parts per million or even higher. The p-toluic acid and 4-CBA contents of the fiber-grade terephthalic acid are each suitably less than 125 p.p.m., desirably less than 75 p.p.m., preferably less than 25 p.p.m., ideally essentially zero. The content of 4-CBA is more critical than p-toluic acid.

The process of the present invention has particular application to purification of terephthalic acid produced by the liquid phase air (molecular oxygen) oxidation of paraxylene using a heavy metal and bromine as catalyst as described in Saffer et al. U.S. 2,833,816. The process of the persent invention may also be used to advantage for purification of terephthalic acid from other processes for the catalytic liquid phase oxidation of para-dialkylbenzenes with molecular oxygen in the presence of heavy metal oxidation catalyst, also promoted with acetaldehyde or methyl ethyl ketone, for the terephthalic acids produced by these oxidation processes also contain 4-CBA impurity. Terephthalic acid from any source which contains 4-carboxybenzaldehyde and which is yellowish in color, can be converted to fiber grade terephthalic acid by the process of this invention.

The process of the invention is conducted at elevated temperature and pressure while the terephthalic acid or other aromatic polycarboxylic acid is dissolved in an inert polar solvent. Examples of suitable solvents include the lower molecular weight alkyl carboxylic acids and water, with water being the preferred solvent. By reason of its low solubility in water, terephthalic acid requires either large volumes of water or high temperatures in order for the desired terephthalic acid production quantity to be put into solution. For reasons of economic equipment design and process operation, it is therefore desirable to conduct the process within the range of about 392 to about 700° F., although lower or higher temperatures may be used in particular circumstances. The most advantageous temperature range is about 440–575° F., e.g. 464–550° F. The quantity of water needed to dissolve the terephthalic acid at various temperatures may be estimated from the table below:

| Terephthalic acid, g./100 g. $H_2O$ | Temperature, ° F. for solution |
|---|---|
| 1 | 365 |
| 5 | 401 |
| 10 | 468 |
| 20 | 498 |
| 30 | 522 |

For the purification of crude terephthalic acid aqueous solution temperatures in the range of 450 to 600° F. are preferred because these solutions carry more than 5 pounds of the acid per 100 pounds of water.

Pressure conditions for the process of this invention depend upon the temperature at which this process is conducted. Since the temperature at which significant amounts of the impure terephthalic acid may be dissolved in water are substantially above the normal boiling point of water, and since the hydrogenation section of the process of this invention is to be carried out with the solvent in the liquid phase, the pressure will necessarily be substantially above atmospheric pressure.

It is preferred to trickle the liquid solution of acid through a bed of the catalyst because lower hydrogen partial pressure or hydrogen driving force is required than is required when the catalyst bed is operated liquid full. Either a static hydrogen atmosphere or a flow, concurrent or countercurrent, of hydrogen through the catalyst chamber may be maintained. Lower hydrogen partial pressures are required for the trickle or percolation method of conducting the hydrogenation section of the process of this invention because there is provided a thin film of the aqueous solution of the impure terephthalic acid on the catalyst particles and thus a lower hydrogen driving force is needed for the hydrogen to dissolve and diffuse through the thin liquid layer and reach the catalyst. For such percolation method of conducting the hydrogenation a continuous flow or atmosphere of hydrogen is not essential. However, for maximum hydrogenation rates it is beneficial to dissolve at least some hydrogen into the solution, conveniently in the acid dissolver, prior to contacting it with the catalyst. The process of this invention can be practiced by intermittent introduction of hydrogen into the bed of extended catalyst during the continuous introduction of the aqueous solution of impure terephthalic acid. The minimum of hydrogen to be introduced intermittently is, of course, an amount of hydrogen in excess of that required for reduction of the dissolved impurity so that adsorption of the excess hydrogen in the porous catalyst support can be simultaneously accomplished. Very little hydrogen is consumed by the purification process of this invention.

It is particularly advantageous according to a preferred embodiment of this invention, to impose on the aqueous solution being treated a pressure above the pressure required to maintain a liquid phase of the aqueous solution of impure terephthalic acid and dissolved hydrogen. This additional pressure prevents premature crystallization of the acid due to minor process pressure variations causing vaporization of some of the solvent. This is readily accomplished by use of an inert, non-condensable gas such as nitrogen. By "inert" gas is meant that gas which is not reactive with the terephthalic acid or the hydrogen or solvent. Nitrogen is a convenient inert gas. An additional benefit accruing from the use of nitrogen is that the dilution of the hydrogen introduced into the process of this invention provides low partial pressure of hydrogen to minimize over-hydrogenation such as, for example, saturation of aromatic nuclei.

In summary of the foregoing with respect to the hydrogenation section of the process of this invention, the hydrogen partial pressure employed in the preferred trickle system can vary in the range of from one atmosphere (14.7 p.s.i.a.) to 150 p.s.i. or more, preferably in the range of about 50 to 100 p.s.i. It will be appreciated that the hydrogen driving force can be so great as to produce severe hydrogenation causing, for example, nuclear hydrogenation of the benzene ring of terephthalic acid thereby converting some of the terephthalic acid to hexahydroterephthalic acid (cyclohexane 1,4-dicarboxylic acid), an undesirable impurity. Such severe hydrogenations should be avoided to prevent the inclusion of additional impurities to be removed in the crystallization section. Mild hydrogenation conditions should therefore be used. By the term mild hydrogenation conditions as used herein and in the appended claims is meant hydrogenation conditions which effect hydrogenation of aldehyde functional groups but which do not effect significant hydrogenation of either carboxyl groups or aromatic nuclei.

Hydrogen treating time, or space velocity, will depend on the initial terephthalic acid purity, that is, the amount of impurity to be reduced, on the desired fiber-grade specifications imposed on the purified terephthalic acid, and on other conditions of the hydrogenation such as for example, catalyst activity. Ordinarily a treating time, i.e. contact time with the catalyst, within the range of about 0.001 to about 10 hours, advantageously about 0.01 to 2 hours, will suffice for most operations. Although treating time is not a critical variable, it must be taken into consideration with regard to the aforementioned severe hydrogenation and its side effects.

Conditions for conducting the process of this invention can be readily ascertained, with respect to adequate vis-a-vis too severe hydrogenation, by simple tests under the conditions selected to be employed with the particular method of conducting the process of this invention. For example, by conducting these simple bench-scale tests there can be readily determined contact time in a flow system, hydrogen driving force for a percolation-type flow system, etc. which enhance the formation of p-toluic acid and avoid formation of cyclohexane 1,4-dicarboxylic acid to a point beyond which this side product is retained in the solvent under the conditions used for crystallizing purified terephthalic acid from the hydrogen treated solution.

The hydrogenation catalyst required for the process of this invention to convert the aldehyde carbonyl group on the 4-carboxybenzaldehyde (4-CBA) at least to a methylol group, e.g. to convert the 4-CBA to p-methylol benzoic acid, and to destroy, or otherwise render innocuous, other impurities present (e.g. those of benzil and fluorenone structure) in the feed terephthalic acid is preferably a Group VIII noble metal, preferably platinum and/or palladium, supported on adsorbent, high surface area charcoal. A wide variety of catalysts has been found efficacious, and while carbon-supported noble metals are outstanding, reference may be made to any of the standard texts on hydrogenation or catalysts for alternative materials which are catalytically effective under aqueous phase hydrogenation conditions. It must be kept in mind, however, that the catalyst used must be one which is useful for effecting the hydrogenation under mild hydrogenation conditions as defined herein. Numerous catalysts are listed, for example, in Kirk and Othmer's "Encyclopedia of Chemical Technology" (Interscience), particularly the chapters on Hydrogenation and Catalysts; Emmett's "Catalysis," (Reinhold), particularly Volumes IV and I on Hydrogenation; Lohse's "Catalytic Chemistry" (Chemical Publishing Company), particularly the sections on Group VIII Metal Catalysts; and such patents as Amend U.S. 2,070,770 and Lazier U.S. 2,105,664. Illustrative catalysts include the Group VIII Nobel Metals Ruthenium, Rhodium, Palladium, Osmium, Iridium, and Platinum, advantageously extended on a support such as activated carbon, e.g. adsorbent charcoal.

The noble metal hydrogenation catalyst for use in the inventive process must have sufficient hydrogenation activity to convert the aldehyde carbonyl group on the carboxybenzaldehyde at least to a methylol group, e.g. p-methylol benzoic acid, and to destroy, or otherwise render innocuous, other impurities present in the feed terephthalic acid. Noble metal supported on adsorbent charcoal in the amount of 0.01–1.0 weight percent, based on total catalyst, is suitable as the hydrogenation catalyst. Advantageously, noble metal contents in the range of about 0.05–0.5 weight percent may be used, with about 0.1–0.3 weight percent being the preferred noble metal content for use in trickle beds of catalyst. The higher noble metal contents tend to produce over-hydrogenation while the lesser amounts suffer some loss in hydrogenation activity as compared with catalysts of the preferred noble metal content.

The adsorbent charcoal support for the noble metal may be any such support which has sufficient mechanical strength and surface area. It has been found that palladium-charcoal catalysts having a palladium content in the preferred range of 0.1–0.3 weight percent and also having a very high surface area in the range of about 1000–3000 square meters per gram of catalyst are particularly well suited for use in the present invention.

The hydrogen treated solution is filtered to remove any suspended solids, such as catalyst support fines and extraneous materials, of about 5 microns and larger in size. The filter requirements are discussed below. The purified acid is then recovered from the filtered solution. Crystallization is a convenient and the preferred method for recovering the purified acid. Either batch or continuous crystallization may be employed in the crystallization section, and preferred embodiments of continuous and batch systems are discussed below in conjunction with the figures shown in the accompanying drawings. Crystallized acid is recovered by centrifuging during which further purification is effected by washing the centrifuge cake. The crystals are dried in a rotary kiln to a moisture content below about 1 wt. percent, preferably about 0.02–0.06 wt. percent, to prevent caking during subsequent storage and shipping.

Regarding materials of construction, it is advantageous to use titanium and/or titanium clad steel for metallic surfaces exposed to TA-water solutions at temperatures above about 350° F. Below this temperature type 304 stainless steel is satisfactory except for the dryer tubes where type 316 stainless steel is preferred. Reinforced polyester is also suitable as an alternate material for use at temperatures below about 250° F.

It has been discovered that, suprisingly, titanium may be used for corrosion protection in contact with the acid solution, and protected from hydride formation and sloughing under reducing environment conditions in contact with hydrogen at temperatures about 350° F. and pressures above 750 p.s.i. by forming a blue oxide coating on the titanium. Such temperature and pressure conditions are encountered in the process of the present invention in such places as, for example, the dissolver preheater, dissolver, reactor, filters, crystallizers, piping, etc. The oxide coating is conveniently formed, and maintained as required, by including a small amount of oxygen, suitably as air, in the solvent-acid slurry feed to the dissolver preheater. All titanium parts in contact with the corrosive solution under corrosion and reducing conditions are thus protected.

Turning now to the drawings, FIG. 1, is a simplified schematic flow plan of a preferred embodiment of the invention. FIGS. 2 and 3 are simplified schematic flow plans illustrating preferred embodiments of alternate continuous and batch crystallization systems, respectively. It is to be understood that these embodiments are for the purpose of illustration and are not to be regarded as a limitation of the scope of the present invention.

Referring now to FIG. 1, dry crude terephthalic acid (TA) feed (e.g. containing 0.5 to 1.0% by weight 4-carcoxybenzaldehyde) from source 10, such as for example a storage silo, is transferred via line 11 into crude terephthalic weigh hopper 12. Crude terephthalic acid is fed from the weigh hopper at a constant rate into the feed slurry tank 13 by the crude terephthalic feeder 14 which suitably can be any solids transfer feeder such as, for example, a Star feeder. The crude terephthalic feeder 14 sets the nominal feed rate to the process, but since such devices are somewhat inaccurate, the average flow rate is determined by weight as measured by the terephthalic acid weigh hopper 12. Recycled water from line 16 is added to feed slurry tank 13 on flow control to provide a slurry concentration of crude TA in water of approximately 15–30 weight percent, preferably about 20–25 weight percent, and in this example about 23 weight percent total solids. Demineralized water is preferred as solvent water. Slurry hold-up in feed slurry tank 13 of about 45 minutes at normal level is sufficient to dampen out fluctuations in the TA and water feed rates to the tank. The temperature in feed slurry tank 13 is maintained at a temperature in the range of about 100–300° F., preferably about 200° F. and the pressure is conveniently near atmospheric at temperatures below the boiling point of water by venting to the atmosphere. Feed slurry tank 13 is provided with an agitator to contact the solid crude TA and the recycled water in order to maintain a uniform slurry.

Slurry is withdrawn from feed slurry tank 13 via line 17 and transferred via high-pressure pump 18 via line 19 through preheater 21. Preheater 21 is conveniently a shell-and-tube heat exchanger with one tube pass. Normally the tube-side velocity of the slurry feed is not sufficient to keep the slurry in suspension, therefore it is advantageous to mount the heat exchanger vertically and employ downflow to prevent loss of effective tube surface as a result of settling of solids. Suitable preheater outlet conditions of temperature and pressure are about 530° F. and 985 p.s.i.a., respectively. The preheater slurry is passed via line 22 into dissolver 23.

The reactor feed stream is passed up-flow through the dissolver 23 which provides a residence time of approximately 20 minutes. The dissolver 23 is provided with an agitator to suspend the solids and to maintain the proper environment for a high solution rate of the crude TA into the water. A clear solution of TA in water overflows from the dissolver 23 via line 24 to the hydrogenation reactor 26 by gravity. This solution, when formed from a slurry of approximately 23 weight percent solids, contains about 30 pounds of crude TA per 100 pounds of water at 530° F. and 985 p.s.i.a. The precipitation (crystallization) point for this solution is 520° F., therefore the solution at 530° F. is only about 10° hotter than the precipitation point.

Crude terephthalic acid solution from line 24 flows continuously into a distribution pan at the top vapor space of the hydrogenation reactor 26. Overflow from the pan trickles onto the palladium-on-carbon catalyst. Flow of hydrogen is advantageously co-current to flow of the TA solution through the catalyst bed, however counter-current flow can be used. The bed is supported by a screen about equivalent to 8-gage Tyler mesh. Catalyst particles are of such size that about 95 weight percent are retained on this screen. However, less than 5 percent of the catalyst is lost from the bed because of the filtering action of the bed itself. Space is provided within the reactor vessel 26 beneath the catalyst bed for vapor disengaging and liquid-level control. Effluent vapors are vented directly to the atmosphere from this vapor space via valved line 38, and liquid level control is maintained by throttling this vented stream.

Hydrogen from source 27, preferably in admixture with an inert gas such as nitrogen, is passed via line 28 into gas preheater-saturator 29. Demineralized water from source 31 is also passed via lines 32 and 33 into gas preheater-saturator 29 wherein the hydrogen-containing gas is heated to reaction temperature and is at least partially, preferably essentially completely, saturated with water vapor. Water-saturated gas from the preheater-saturator 29 is passed via lines 34 and 36 into the top vapor space of the reactor 26 and via lines 34 and 37 into the center section of the dissolver 23 so that hydrogen is dissolved in the solution and thus is readily available to effect hydrogenation upon contact with the catalyst in reactor 26.

Prehumidification of the hydrogen-containing gas with water in preheater-saturator 29 is for the purpose of preventing localized crystallization of TA from the solution with consequent plugging which would occur if dry gas were fed into the reactor depriving the solution of water. The necessary degree of saturation of the hydrogen stream with water depends upon the equilibrium solubility of solid in the liquid, the inlet liquid temperature, and the amount of hydrogen which is consumed by the reaction. If pure hydrogen is used without inert diluent, the inlet gas stream is saturated at 530° F. and the reactor is pressure controlled, then the pressure of hydrogen in the reactor will be below 100 p.s.i.a. for liquid feed temperature above 530° F. The hydrogen partial pressure in the reactor will decrease to as low as 50 p.s.i.a. as the temperature is increased to 535° F. The hydrogen partial pressure is greater than 100 p.s.i.a. for liquid feed temperatures below 530° F. but there is a smaller quantity of vent gas due to steam condensation. At a reactor temperature of 525° F. and the normal hydrogen feed rate of 0.37 mole of hydrogen flowing through the reactor per 10,000 pounds of solution feed, the vent stream will decrease to about one-fourth of the saturated gas feed rate. The normal hydrogen partial pressure in the reactor is about 100 p.s.i. with the water vapor pressure contributing an additional 885 p.s.i.a. If lower hydrogen partial pressures are used it is advantageous to include an inert gas, such as nitrogen, with the hydrogen gas feed in order to provide a pressure pad to preclude vaporization of solvent, and consequent precipitation and plugging due to minor process pressure variations.

Control of liquid stream temperature is critical to stable operation. Care must be taken that the stream does not contact local cold or hot spots in pipes or vessels. In particular, if the liquid stream temperature rises above about 540° F., boiling occurs with resulting solidification of TA. Experience has indicated that it is practically impossible to redissolve this material under process conditions.

Hydrogenated solution is withdrawn from reactor 26 via line 39 and passed through reactor effluent filter 41 to remove any catalyst fines resulting from attrition of the carbon catalyst base. The filter elements are capable of removing particles of about 5 microns and larger in size. The filter elements have a minimum pressure drop corresponding to about 1 g.p.m./ft.$^2$/p.s.i. with a desired maximum total pressure drop of 10 p.s.i. Filter elements are conveniently cleaned by flushing with hot water and, if necessary, by soaking in dilue caustic. This procedure will remove from the elements any precipitated TA deposited during depressuring of the filter prior to backwashing. Prior to putting a new or cleaned filter on stream it should be filled with water to prevent plugging due to TA solidification. Although only one filter is shown in FIG. 1, it is contemplated that two or more filters may be used so that at least one filter may be in service while another is being cleaned.

Since the TA solution is highly corrosive at reactor effluent temperature, careful selection of suitable corrosion resistant elements for use in the filter is required. Filter elements from sintered titanium are satisfactory from the standpoint of corrosion, but their mechanical strength is borderline. Porous carbon beds of either loose carbon particles or bonded carbon particles have been found to be particularly suitable for this filtering application.

A suitable test to determine the effectiveness of the filter is to dissolve 5 grams of product TA in dimethylformamide and pass the resulting solution through filter paper to remove any solid fines. This filter paper is compared against a standard in which 0 represents clean filter paper and 5 is approximately gray in tone. Product TA having a rating of 0 to 1, barely distinguishable from clean filter paper, is considered satisfactory.

Filtered reactor effluent is passed via line 42 and inlet valve 82 to crystallization section 43 which is discussed in detail below and illustrated as alternate continuous and batch crystallation systems in FIGS. 2 and 3. In the crystallation section water is removed from the hot TA solution by high rate evaporative cooling. As a result of both the cooling and the solvent removal, TA crystallizes from solution. Evaporated water is condensed and the condensate is withdrawn from the crystallation section and passed via line 44 into recycle solvent drum 46. The slurry of TA crystals resulting from the crystallization is withdrawn from the crystallization section via line 47 and passed into centrifuge feed tank 48 which is vented to the atmosphere by line 49. The centrifuge feed tank 48 is provided with an agitator to maintain the slurry of TA crystals in suspension. The TA slurry is passed from the centrifuge feed tank 48 via valved line 51 into one or more centrifuges 52 wherein the crystals are separated from the mother liquor and the crystals washed with fresh demineralized wash water obtained from source 31 via lines 32, 53 and 54. Wash water from the centrifuge is passed via line 55 into the recycle solvent drum 46. Mother liquor is withddrawn from the centrifuge and discarded via line 56. Purified TA crystals from the centrifuge 52 are withdrawn from the centrifuge and fed via auger feeder 57and 57a into rotary kiln crystal dryer 58 which is heated by steam from source 59. Inert gas, such as nitrogen, from source 61 may be passed via line 62 into and through drying kiln 58 to assist in removing moisture from the TA crystals. The produce is dried to a moisture content of about 0.05 wt. percent water. Inert gas and water vapor containing some TA fines are withdrawn from the kiln 58 and passed via line 63 into dryer-scrubber 64 wherein the gases are washed countercurrently by a steam of fresh demineralized water. The water is introduced to the dryer-scrubber 64 from source 31 via lines 32, 53 and 66 and descends countercurrently to the rising gas stream removing TA fines from the gases which are vented from the scrubber via line 67. Water containing TA fines is withdrawn from the dryer-scrubber 64 and passed via lines 68, pump 69 and line 71 into the recycle solvent drum 46. The solvent drum is vented to the atmosphere via line 72. An agitator is provided within the solvent recycle drum 46 in order to maintain undissolved particles of TA, primarily from scrubber 64, in suspension. Recycle solvent water is withdrawn from the recycle solvent drum 46 and passed via line 73, pump 74 and line 16 into the feed slurry tank 13. Dried purified TA product is withdrawn from the drying kiln 58 and passed via conveyor 76 to storage.

The purified product contains less than 25 p.p.m. by weight of 4-CBA and also less than 95 p.p.m. by weight of p-toluic acid. The T.E.G. color of the product is below 50 which is well below the suitable maximum of 150 and the desirable maximum of 100.

The 4-carboxybenzaldehyde content was determined by dissolving the terephthalic acid in dilute alkali and buffering to a pH of 9, followed by polarographic analysis to determine "4-CBA" content. Color, expressed as "T.E.G. Color" (triethylene glycol color) was determined by esterifying 4.0 grams of the terephthalic acid with 28.4 cc. of triethylene glycol at 500° F. followed by dilution to 50 vol. percent with isopropanol and comparing the resultant solution color with American Public Health Association (APHA) standards.

Reference is now made to FIG. 2 which is a simplified schematic flow plan illustrating a preferred embodiment of a continuous crystallization system for use in the process of the present invention. The first crystallizer 81 receives filtered reactor effluent at 530° F. and 985 p.s.i.a. via valved line 42 (FIG. 1). Flashing occurs across the inlet valve 82 to 725 p.s.i.a. and a temperature of about 507° F. Vapor released during flashing is passed via valved line 83 and line 84 into the crystallizer condenser 86. The hold-up time in the first crystallizer 81 is about 1.1 hours. Approximately 30 percent of the dissolved terephthalic acid is precipitated at a rate of about 0.15 lb. TA/min./100 lbs. $H_2O$. The first crystallizer 81 is provided with an agitator to suspend the terephthalic acid crystals in the form of a slurry. Slurry is withdrawn from the first crystallizer 81 and passed via valved line 87 into the second crystallized 88. Slurry concentration in the effluent from the first crystallized is approximately 7.1 weight percent solids.

The second crystallizer 88 is operated at 115 p.s.i.a. and a temperature of about 338° F. Vapor resulting from the further flashing of solvent in the second crystallizer 88 is passed via valved line 89 and line 84 into the crystallized condenser 86. Hold-up time in the second crystallizer 88 is about 1.2 hours. The terephthalic acid crystallization rate in the second crystallizer is about 0.4 lb. TA/min./100 lbs. $H_2O$. Effluent slurry concentration from the second crystallizer is approximately 29.1 weight percent solids. The second crystallizer 88 is also provided with an agitator to maintain the TA crystals in slurry suspension.

Slurry is withdrawn from the second crystallizer 88 and passed via valved line 91 into the third crystallizer 92 which operates at a temperature of about 228° F. and 20 p.s.i.a. with a liquid hold-up time of about 1.1 hours. Nearly all of the terephthalic acid, about 98.6 weight percent, is crystallized under the operating conditions in the third crystallizer. Flashed solvent vapors are withdrawn from the third crystallizer 92 and passed via valved line 93 and line 84 into the crystallizer condenser 96. The third crystallizer 92 is also provided with an agitator to maintain the crystallized TA in suspension in the form of a slurry. Condensate from crystallizer condenser 86 is passed via line 44 into recycle solvent drum 46. Slurry containing about 32.5 weight percent solids is withdrawn from the third crystallizer 92 and passed via valved line 47 into centrifuge feed tank 48 (FIG. 1).

In reference to FIG. 3, which is a simplified schematic flow plan illustrating a preferred embodiment of a batch crystallization system, it is pointed out that this batch system and the previously discussed continuous crystallization system are alternative crystallization sections for use in the process of this invention as illustrated in FIG. 1. Referring now to FIG. 3, effluent hold tank 101 receives filtered reactor effluent continuously via valved line 42 (FIG. 1) under temperature and pressure conditions of 530° F. and 985 p.s.i.a., respectively. A small amount of solvent flashing occurs across the inlet valve 82 to about 885 p.s.i.a. with only a minor decrease in stream temperature. Essentially all of the dissolved hydrogen is released from the liquid in this vessel. Solvent vapor and gas is passed via valved line 102 and line 84 into crystallizer condenser 86.

While three crystallizer vessels are illustrated in FIG. 3, it should be understood that any number, one or more, of crystallizer vessels may be employed. Hot TA solution is alternatively passed from effluent hold tank 101 into each of the crystallizers A, B and C via line 103 and valved manifold line 104. High pressure steam, nominally 1,000 p.s.i., is used to pressure each crystallizer prior to its fill cycle in order to prevent flashing of the hot solution into a nearly empty crystallizer vessel causing plugging of the inlet line. This steam is introduced from source 106 via line 107 and valved manifold 108 into the vapor space of each crystallizer prior to its fill cycle. High pressure system is also fed via valved line 109 into effluent hold tank 101 during its dumping cycle to displace charged solution therefrom preventing excessive solvent vaporization. This steam is then vented via valved line 102 and line 84 into the crystallizer condenser 96 during the hold tank's filling cycle.

The crystallization cycle of each crystallizer includes the following: vessel heating and pressurization with steam, filling, cooling and crystallizing, and dumping. The cooling period is divided into three regions of limiting conditions:

(1) Crystallization rate,
(2) Vaporization rate and
(3) Vapor loading and defoaming rate.

The rate of cooling during the first 15 minutes of the cooling and crystallizing period is limited to a crystallization rate of 1.5 lbs. TA/100 lbs. $H_2O$/min. by controlling the rate of water vapor flow from the crystallizer. The final cooling period is self limited by the rate of release of water vapor from the liquid surface at the lower temperatures existing at the time. The maximum crystallization rate has been set at 1.5 lbs. TA/100 lbs. $H_2O$/min. in order to prevent shock cooling with the consequent formation of an excessive number of infinitesimal crystals and, more importantly, to prevent inclusion within the TA crystals of para-toluic acid and other impurities, which inclusion has been found to occur excessively at crystallization rates such as result when the solvent (water) vapor is flashed without controlling the evaporation rate such as can be conveniently done by throttling the vapor outlet line.

Crystallizer agitators are provided in each of the crystallizer vessels to maintain slurry suspension during the cooling and dumping cycles. Vapors from each of the crystallizers are passed via manifold line 110 and line 84 into crystallizer condenser 86.

Crystallizer effluent is transferred via manifold line 111 into the crystallizer hold tank 112 by pressuring the crystallizers with 150 p.s.i.g. steam from a source not shown. This transfer is performed under steam presure to avoid flashing in manifold line 111 with consequent plugging. The effluent is flashed across the inlet valve 113 to atmospheric pressure in crystallizer hold tank 112, which pressure is maintained by venting to the atmosphere via valved line 114. Crystallizer hold tank 112 is provided with an agitator to maintain the TA crystals in slurry suspension. Slurry is pumped from the crystallizer hold tank 112 via line 116, transfer pump 117 and valved line 47 into centrifuge feed tank 48 (FIG. 1).

Vapor loading and defoaming rate are handled according to conventional design techniques.

What is claimed is:

1. In a process for purifying aromatic polycarboxylic acid produced by liquid phase catalytic oxidation of polyalkyl aromatic hydrocarbon to remove undesirable aldehydic aromatic carboxylic acid and other impurities including the step of contacting an aqueous solution of said impure acid and hydrogen-containing gas with a noble metal-containing catalyst by percolating said aqueous solution as a liquid phase and hydrogen-containing gas through a bed of said catalyst; the improvements of conducting said contacting step with said aqueous solution at a temperature of about 10° F. above the solute precipitation point and using hydrogen-containing gas phehumidified with water vapor at the temperature of said contacting step.

2. The process of claim 1 wherein the solute in the solution used in said contacting step is terephthalic acid contaminated with p-formylbenzoic acid and other reducible impurities, the solution temperature is in the range of 450° to 600° F. and said solute concentration is equal to terephthalic acid supersaturation concentration at a temperature 10° F. below the solution temperature.

3. The process of claim 2 wherein the solution is at 450° to 600° F. and is combined with hydrogen-containing gas saturated with steam at 450° to 600° F. before percolation through the catalyst.

4. The process of claim 2 wherein before contact with the catalyst there is injected into the solution at 450° to 600° F. hydrogen-containing gas saturated with steam at 450° to 600° F. to dissolve some hydrogen in the solution and leave the remainder of the hydrogen in the gas phase and then the new solution and hydrogen-containing gas are percolated through the catalyst.

5. The process of claim 4 wherein the solution is at 530° F., 985 p.s.i.a., the solute concentration is 23 weight percent and hydrogen-containing gas is saturated with steam at 530° F. and 885 p.s.i.a.

6. The process of claim 2 wherein the hydrogen-containing gas is a mixture of hydrogen and nitrogen gas.

References Cited

UNITED STATES PATENTS 3,151,154   9/1964   Sargent et al. _____ 260—525

FOREIGN PATENTS 786,897   11/1957   Great Britain _____ 260—525
726,213   3/1964   Canada _____ 260—525

LEWIS GOTTS, Primary Examiner

R. WEISSBERG, Assistant Examiner (5/69)

CERTIFICATE OF CORRECTION

Patent No. 3,639,465  Dated February 1, 1972

Inventor(s) GEORGE P. OLSEN, PHILIP H. TOWLE and RICHARD H. BALDWIN

It is certified that error appears in the above-identified patent and that said Letters Patent are hereby corrected as shown below:

Column 2, line 10: Netherlands application No. "6,403,348" should read -- 64-03348 --

Column 3, line 55: "persent" should read -- present --

Column 7, line 5: "4-carcoxy" should read -- 4-carboxy --

Column 8, line 25: "temperature" should be plural

Column 8, line 60: "dilue" should read -- dilute --

Column 9, line 33: "withdrawn" has a double "d"

Column 9, line 36: "feeder" should be plural

Column 10, line 18: "crystallized" should be -- crystallizer --

Column 10, line 24: (Same error as in column 10, line 18 above)

Column 10, line 40: "condenser 96" should read -- condenser 86 --

Column 10, line 75: "sys-"   to
Column 11, line 1: "tem" should be the word -- steam --

Column 11, line 5: "oondenser 96" should read -- condenser 86 --

Column 12, line 13: In Claim 1 "phehumidified" should read -- prehumidified

Signed and sealed this 28th day of November 1972.

(SEAL)
Attest:

EDWARD M. FLETCHER, JR.
Attesting Officer

ROBERT GOTTSCHALK
Commissioner of Patents